Jan. 1, 1929.　　　　J. M. SUDDUTH　　　　1,697,837
PASTRY MIXER
Filed Jan. 9, 1928
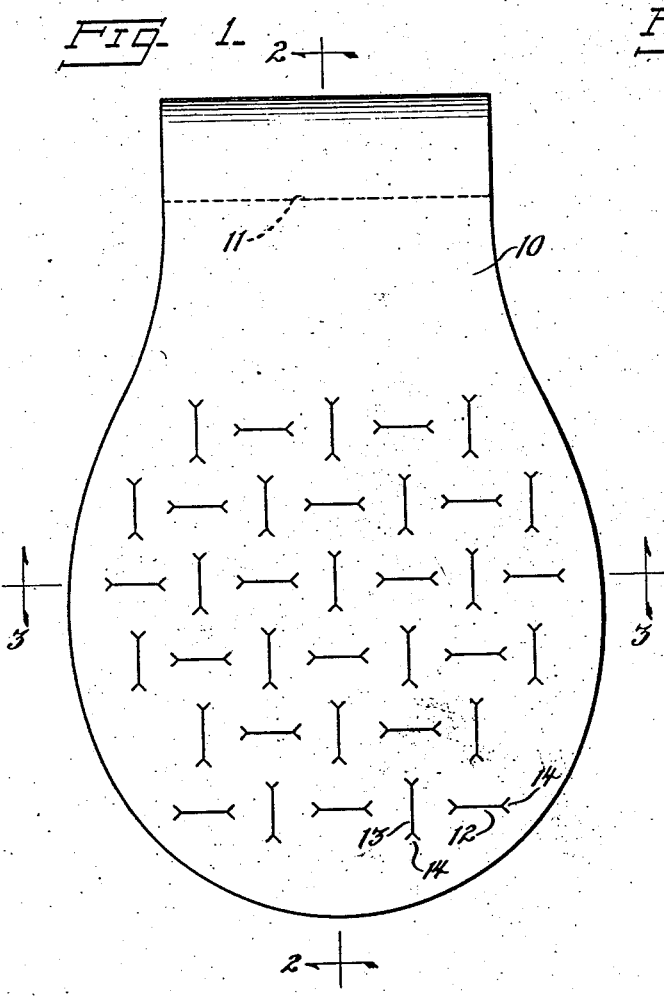
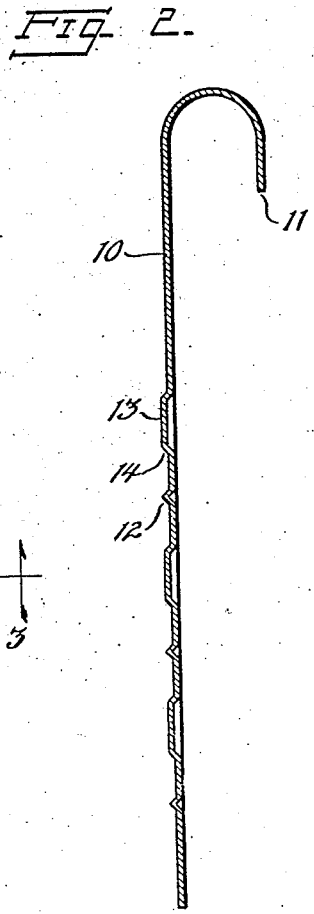
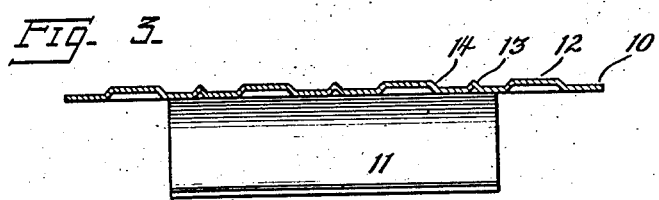
WITNESSES
INVENTOR
James M. Sudduth.
BY
ATTORNEY Patented Jan. 1, 1929.

1,697,837

UNITED STATES PATENT OFFICE.

JAMES M. SUDDUTH, OF PIERRE, SOUTH DAKOTA.

PASTRY MIXER.

Application filed January 9, 1928. Serial No. 245,494.

My invention relates to means for mixing pastry by rubbing the pastry dough between two similarly formed elements.

The general object of my invention is to provide a device for the indicated purpose, made in duplicate, to move relatively to each other, adapted to be held in the hands, and having dough-engaging members thereon at pronounced angles to each other, preferably at right angles, and so arranged and disposed as to effectively grip the dough and cause the same to be worked in a manner to result in a superior pastry.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a face view of one of the pastry mixing elements embodying my invention;

Figure 2 is a longitudinal section taken on the line 2—2 of Figure 1; and

Figure 3 is a cross section taken on the line 3—3 of Figure 1.

It having been understood that two of the devices illustrated are used, and that one is a duplicate of the other, it suffices to show and describe one as follows:

An element 10, made from sheet metal in practice, is provided which is generally ovate in form for its major portion, and at one end is somewhat reduced in area and return bent to form a broad hook-like handle 11.

The plate 10 is formed over its major area with transversely disposed elongated rubbing members 12 presenting sloping sides diverging to the apex of each of said members. These rubbing members are disposed in transverse rows or series, and alternating with the transversely disposed members 12 are rubbing members 13 at a pronounced angle to the members 12 and preferably at right angles. The ends 14 of the members 12 and 13 slope and merge into the flat material of the element 10.

The above described construction is effective in gripping the pastry dough and causing the same to be worked thoroughly to form pastry of the desired quality.

I would state, furthermore, that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. In a means for mixing pastry, a mixing element presenting a base member having a broad area provided with rows of longitudinally and transversely extending rubbing members, the members in each row being raised, and alternating members being at a pronounced angle to each other.

2. In a means for mixing pastry, a mixing element presenting a base member having a broad area provided with rows of longitudinally and transversely extending rubbing members, the members in each row being raised, and alternate members being at right angles to each other.

3. In a means for mixing pastry, a mixing element presenting a base member having a broad area provided with rows of longitudinally and transversely extending rubbing members, the members in each row being raised, and alternating members being at a pronounced angle to each other, the said element being formed of sheet metal and being turned at one end on itself to form a hook-like handle.

Signed at Albuquerque, in the county of Bernalillo, and State of New Mexico, this 3rd day of January A. D. 1928.

JAMES M. SUDDUTH.